US006289466B1

(12) United States Patent
Bayramoglu et al.

(10) Patent No.: US 6,289,466 B1
(45) Date of Patent: Sep. 11, 2001

(54) USAGE OF MONITOR BEZEL BUTTONS TO CONTROL AND INDICATE MULTIMEDIA FUNCTIONS

(75) Inventors: Gokalp Bayramoglu, Houston; Henry M. D'Souza, Cypress; Valiuddin Ali, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/885,586

(22) Filed: Jun. 30, 1997

Related U.S. Application Data

(60) Provisional application No. 60/049,979, filed on Jun. 11, 1997.

(51) Int. Cl.[7] ................................ G06F 1/26; G06F 1/28; G06F 1/30
(52) U.S. Cl. .................... 713/310; 713/300; 713/320; 713/330; 713/340; 714/22; 710/8; 710/10; 710/14
(58) Field of Search ................ 395/750.01, 750.02, 395/750.03, 750.05, 750.07, 750.08, 182.2, 154, 500; 345/10, 514; 365/227; 370/465, 79; 713/300–340; 714/22; 710/8, 10, 14

(56) References Cited

U.S. PATENT DOCUMENTS 5,319,705 * 6/1994 Halter et al. .............................. 380/4
5,375,245 * 12/1994 Solhjell et al. ................. 395/750.03
5,428,730 * 6/1995 Baker et al. .......................... 395/154

(List continued on next page.)

FOREIGN PATENT DOCUMENTS

| 19543942A1 | 5/1997 | (DE) . |
| 0701194A1 | 8/1995 | (EP) . |
| 11030976A | * 2/1999 | (JP) . |

OTHER PUBLICATIONS

*European Search Report*, EP 98 30 4568, Oct. 8, 1998, 2 pp.
*E–Mail/Fax In–Box Indicator*, IBM® Technical Disclosure Bulletin, vol. 39, No. 7, Jul. 1996, pp. 171–172.
*Convenient Hard–Disk Usage Monitor*, IBM® Technical Disclosure Bulletin, vol. 36, No. 09B, Sep. 1993, p. 275.
*Monitor Indicators*, IBM® Technical Disclosure Bulletin, vol. 37, No. 12, Dec. 1994, p. 219.
Intel® Universal Host Controller Interface (UHCI) Design Guide, Revision 1.1, Mar. 1996. pp. 1–41, Copyright 1996.
Intel® 8x930Ax, 8x930Hx Universal Serial Bus Microcontroller User's Manual, pp. 1–1 through 2–17.
Intel® Corporation, Advanced Information 8x930Hx Universal Serial Bus Hub Peripheral Controller, May 1997, pp. 1–33, Copyright 1997.
Intel® Corporation, Intel's New 430TX PCIset Richer Multimedia Plus World–Class Power Management, Copyright 1997.

(List continued on next page.)

Primary Examiner—Rupal Dharia
(74) Attorney, Agent, or Firm—Akin, Gump, Strauss, Hauer & Feld, LLP

(57) ABSTRACT

A computer system includes a monitor having a universal serial bus (USB) interface for connecting with a base system. Multiple button and LED controls are conveniently placed on a front bezel of the monitor. As the buttons are actuated, commands are passed to the base system via the USB. An on-screen display button causes an application to be launched on the base system for modifying screen attributes stored in a monitor controller in the monitor. A USB controller in the monitor updates the monitor controller via the USB. A multifunction audio dial is toggled by a bezel button between volume, bass and treble functions. The USB controller is also operable to provide a sustain a blinking LED even while the base system is in a sleep mode. LEDs on the front bezel indicate monitor and base system power status.

12 Claims, 6 Drawing Sheets

U.S. PATENT DOCUMENTS

| | | | | |
|---|---|---|---|---|
| 5,436,898 | * | 7/1995 | Bowen et al. | 370/79 |
| 5,440,690 | * | 8/1995 | Rege et al. | 395/200.02 |
| 5,483,260 | * | 1/1996 | Parks et al. | 345/156 |
| 5,553,294 | | 9/1996 | Nanno et al. | 713/340 |
| 5,559,531 | | 9/1996 | Schiffer | 345/168 |
| 5,563,839 | * | 10/1996 | Herdt et al. | 365/227 |
| 5,565,897 | | 10/1996 | Kikinis et al. | 345/213 |
| 5,581,772 | | 12/1996 | Nanno et al. | 713/340 |
| 5,630,104 | * | 5/1997 | Ottesen et al. | 395/500 |
| 5,636,211 | * | 6/1997 | Newlin et al. | 370/465 |
| 5,638,083 | * | 6/1997 | Margeson | 345/10 |
| 5,657,417 | | 8/1997 | Di Troia | 358/829 |
| 5,680,323 | * | 10/1997 | Barnard | 364/514 A |
| 5,708,820 | * | 1/1998 | Park et al. | 395/750.05 |
| 5,758,172 | * | 5/1998 | Seo | 395/750.01 |
| 5,758,174 | | 5/1998 | Crump et al. | 713/323 |
| 5,781,028 | | 7/1998 | Decuir | 326/30 |
| 5,802,318 | | 9/1998 | Murray et al. | 710/100 |
| 5,815,679 | * | 9/1998 | Liu | 710/129 |
| 5,831,597 | * | 11/1998 | West et al. | 345/163 |
| 5,867,149 | * | 2/1999 | Jaeger | 345/172 |
| 5,938,772 | * | 8/1999 | Welch | 713/320 |

OTHER PUBLICATIONS

Microsoft Corporation, WDM USB Driver Interface, Copyright 1997.

Microsoft Corporation, USB Plug and Play IDs and Selecting Device Drivers to Load, Copyright 1997.

USB (Universal Serial Bus) Home Page, The Simple and Flexible Way to Connect External Devices to Your Desktop or Notebook PC.

S3, Products Descriptions.

Standard Microsystems Corporation (SMC®), Personal Computer Input/Output Products, Copyright 1995–1997.

ESS Technology, Inc., ES1887 AudioDrive Product Brief.

* cited by examiner

US 6,289,466 B1

USAGE OF MONITOR BEZEL BUTTONS TO CONTROL AND INDICATE MULTIMEDIA FUNCTIONS

This application claims the benefit of U.S. Provisional Application No. 60/049,979 entitled "BEZEL BUTTON FUNCTIONS," filed Jun. 11, 1997.

BACKGROUND OF THE INVENTION

1. Field of the Invention

The invention relates to indicating power status of a host computer system and a monitor with light emitting diodes mounted on the monitor, and more particularly to communicating power status of the host computer system over a universal serial bus.

2. Description of the Related Art

As computer systems become more complex there has been an ever increasing effort to simplify the operation of the computer system. Early computers were difficult to use and understand. Typically, the computer was controlled with memorized keystrokes and command sequences. If the keystrokes were not memorized, the user was left with no alternative but to thumb through pages of documentation to find the elusive command.

Over time, the keyboards were enhanced to include function and control keys. However, the addition of keys to the original keyboard had certain drawbacks, such as additional confusion and a lack of consistency in their use. For many computer users, memorizing and typing in commands to the computer via the keyboard is awkward and complicated. Because of this, alternate data input devices to the keyboard have been developed.

One of the most popular of these alternate data input devices is a mouse. To maximize the usefulness of the mouse and to simplify entry of commands into a computer, a graphical operating system has been developed by Microsoft Corporation and others. By using the mouse, the user can move a pointer across the screen to select functional screen elements, such as a pull down menu, icon or button. However, as computer systems, operating systems and software applications have become increasingly powerful, many more menus, icons and buttons are available for selection by the user. Operating systems and software applications may require a user to navigate many "levels" of pull down menus or icons before reaching the desired function or command. Under these circumstances, instead of simplifying the entry of commands to the computers, the graphical user interface sometimes adds complexity and confusion. Thus, there is still a need for some input method or apparatus that increases "user friendliness" by reducing operator confusion when performing or executing certain system functions.

The computer industry is continually striving to provide additional computer enhancements to entice computer novices to purchase a computer system. Despite the near universal presence of the computer in the office environment, many people still are uncomfortable with computers and are reluctant to purchase or upgrade a home computer. Therefore, it is important for computer designers to add new features in a cost effective manner to new computer products, while at the same time giving the user a feeling of familiarity and comfort. For example, a CD-ROM drive in a modern computer often doubles as an audio CD player. A computer may also double as a VCR, television or a telephone answering machine. Other roles for the computer will inevitably develop. While the user may be familiar with the operation of these devices, the benefit of adding these functions into the computer is often undermined because the average user may be unable or unwilling to access the menus or controls to operate these enhanced features. For instance, to use the CD-ROM player as an audio CD player, a user is required to proceed with the mouse through multiple levels of icons or pull-down menus before a CD is loaded and ready to play. The user must then use the mouse to select "play music" from a menu or screen before music is played. Therefore, as the array of options increases, users will be faced with increasingly complex graphics user interfaces unless another solution is found.

One approach to solving the problem has been disclosed in U.S. patent application Ser. No. 08/846,333 entitled "Computer Interface With Hardwire Button Array," filed on Apr. 30, 1997 and assigned to Compaq Computer Corporation. That application discloses a set of button switches, referred to as a button array, mounted to the top of a mini-tower computer system. Each button in the array provides a particular control function, such as controlling the playback of CD's, answering telephone calls, and other desired system functions. To identify the functions controlled by the buttons, each button is labeled with alphanumeric characters or icons representing the function associated with the button. Some buttons also have a light emitting diode (LED) associated with it to indicate status.

Although using a button array is an effective solution to the problem, being able to easily access the buttons sometimes may be difficult if the mini-tower is not within reach. Without being able to easily access the button array, the user may be discouraged from using the buttons. Furthermore, if status information is presented with an LED but the mini-tower is not within a convenient viewing range, the status information goes unappreciated.

Another approach to solving the problem has been disclosed in U.S. patent application Ser. No. 08/667,582, entitled "Controlling Multimedia Aspects of a Computer," filed on Jul. 12, 1996 and assigned to Compaq Computer Corporation. That application discloses a monitor having a volume control knob on its front control panel. This, of course, is a hardware alternative to the software solution offered by the operating system which requires a mouse. Embedded within the monitor is a microcontroller for sensing rotation of the volume control knob and communicating the movement back to a host computer. A proprietary interface was developed between the monitor and the computer system. A signal is sent directly to an audio chip over a pair of spare wires in a conventional video graphics array (VGA) cable.

Although this is an outstanding concept, the design incurred a noticeable delay from the actuation of the volume knob to the audible response of the system due to a 40 ms delay requirement of the audio chip. This caused the audio system to respond slowly and unpredictably. Additionally, the method is not easily transportable to other computer systems due to the proprietary nature of the solution.

Yet another problem exists with respect to digital controls on the monitor. Typically, there are several dedicated buttons on the bezel of the monitor for controlling such screen functions as horizontal and vertical size and position, color contrast and brightness. In an effort to reduce costs, the dedicated buttons were replaced with multifunction buttons which allowed the user to select one of the functions to adjust from an on screen display (OSD) menu provided by a controller in the monitor. However, the menuing system was text based and cumbersome. Additionally, a special controller was required in the monitor to provide the on screen display which added to the cost. Therefore, it was desirable to provide a better user interface to monitor functions.

SUMMARY OF THE INVENTION

A computer system according to the present invention includes a monitor and a base system having a processor. The monitor includes a front bezel having controls and light emitting diodes (LEDs) for indicating status. The monitor is connectable to the base system by a universal serial bus (USB). The USB permits bidirectional communication between the monitor and the base system. Some controls, such as CD-ROM play, next track previous track pause and stop commands are push buttons which supply commands to the base system. Other controls initiate a process which causes information to be supplied to the monitor.

The monitor includes a monitor controller for adjusting monitor attributes according to user's wishes. The monitor also includes a USB controller for communicating with the base system.

An on-screen display (OSD) button on the monitor causes an application to be launched on the base system for controlling monitor attributes. The application is conveniently operated under the Windows operating system with a mouse. Before the application is displayed on the monitor, the base system requests the monitor to supply current monitor attributes maintained by the monitor controller. After the current attributes have been displayed and adjusted, the base system sends the new attributes to the monitor via the USB. The USB controller on the monitor receives the adjustments and sends them to the monitor controller.

An audio dial operates as a volume, bass and treble control. One of the bezel buttons controls which function the audio dial is adjusting. When the audio dial is operated, data sent to the base system over the USB causes three bars (volume, bass and treble) to be displayed on the monitor for making the adjustment. As the bezel button toggles the function of the audio dial, the bar changes color to indicate which function is selected.

Other bezel buttons have specific or general purpose functions. Examples of specific functions are, CD play, start stop, pause, eject, and rewind, telephony functions, and sleep/awake modes.

A further enhancement results from the bidirectional communication between the monitor and base system. The power status of the base system and monitor is represented in a unique MOON and SUN shaped LEDs. Additionally, one of the bezel buttons is dedicated to moving the computer system in and out of sleep mode.

As an extension of this technology, a telephone message indicator light can also blink on a monitor that is connected to the base system via a universal serial bus (USB). In this implementation, when the base system is put into sleep mode, it includes a USB controller chip which is itself powered down, thus saving power. In this mode, no communications can occur over the universal serial bus. Instead of messages being passed over the USB, according to the invention, a controller is implemented within the monitor itself which remains powered by the monitor power. This controller continues to blink a light on the monitor itself to indicate that a message is available, or otherwise leave the light off if a message is not. The controller is preferably controlled by software downloaded from the base system or by firmware embedded within the controller or within a flash ROM. If a telephone call were to come into the base system, the base system would come out of sleep mode, answer the call, record the message, and send a message over the USB to indicate that the message available light should be blinked by the controller within the monitor.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosure is hereby incorporated by reference:

U.S. Provisional Application Serial No. 60/049,979 entitled "Bezel Button Functions," by Valiuddin Ali, William W. Diehl, Henry D'Souza, Gokalp Bayramoglu and Gary C. Welch, filed Jun. 11, 1997.

Figure 1:
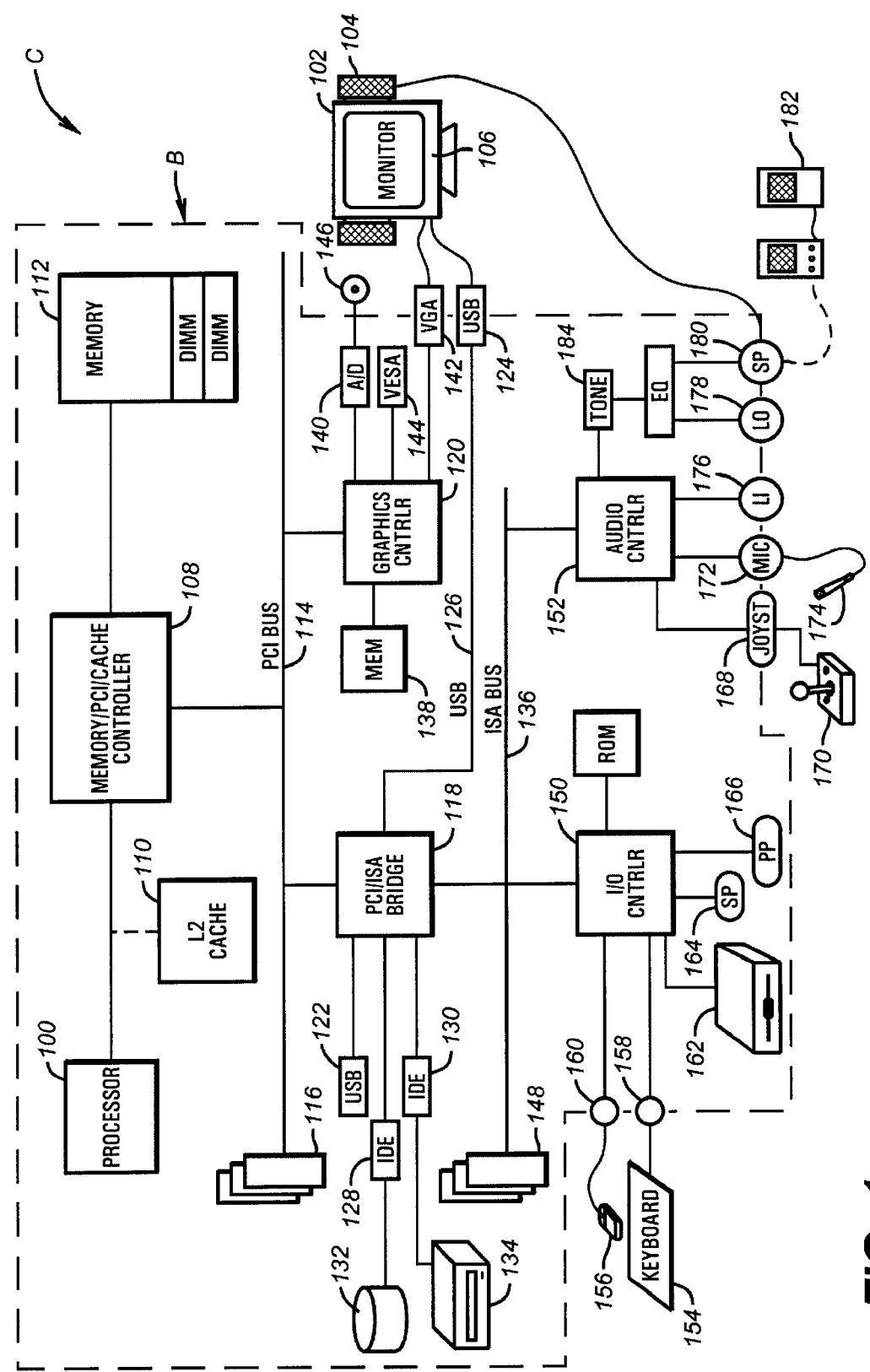
FIG. 1 is a block diagram illustrating a computer system C according to the preferred embodiment.

Turning now to FIG. 1, a computer system C suitable for an embodiment of the present invention is shown. The computer system C is comprised of a base system B and a monitor M 102. A desktop style computer system is illustrated although the present invention works equally as well on servers and other types of computer systems. The base system B includes a processor 100, such as a Intel Pentium or Pentium II processor and other support circuitry. The monitor 102 is a 15" or 17" cathode ray tube (CRT) style monitor having a pair of audio speakers 104 and a front bezel 106. Included with the monitor 102 are buttons and light emitting diodes (LEDs) on the front bezel 106. The buttons provide control to the processor 100 while the LEDs are responsive to the processor 100. Communication between the buttons, LEDs and processor 100 is over a universal serial bus (USB). Although the preferred embodiment is a CRT monitor, the principles disclosed herein are equally applicable to other types of monitors, such as flat screen monitors. It is also noted that other devices besides monitors can utilize the present invention.

Coupled to the processor 100 in the base system B is a memory/PCI/cache controller 108, and optionally, a level 2 cache 110. The mnemonic "PCI" stands for Peripheral Component Interconnect which is a well known computer bus. The memory/PCI/cache controller 108 forms a host-to-PCI bridge and provides the second level cache control and a full function 64-bit data path to a main memory 112. The memory/PCI/cache controller 108 integrates cache and main memory control functions and provides bus control to transfers between the processor 100, cache 110, main memory 112, and a PCI bus 114. On example of the memory/PCIcache controller 108 is an Intel 82439TX system controller.

Also coupled to the PCI bus 114 are one or more PCI slots 116, a PCI/ISA bridge 118 and a graphics controller 120. The mnemonic "ISA" stands for Industry Standard Architecture. The PCI/ISA bridge 118 is a multifunction PCI device implementing a PCI-to-ISA bridge function, a PCI intelligent disk electronics (IDE) function, a Universal Serial Bus (USB) host/hub function, and an enhanced power management function. Coupled to the PCI/ISA bridge 118 are a pair of USB connectors 122 and 124 which provide connectivity to a universal serial bus 126; a pair of IDE connectors 128 and 130 for connecting with a hard disk drive 132 and a compact disk read only memory (CD-ROM) 134; and an ISA bus 136. One example of the PCI/ISA bridge 118 is an Intel 82371AB PCI-to-ISA IDE accelerator.

The graphics controller 120 is further coupled and supported by a video frame memory 138 and an analog-to-digital converter 140, such as a Brooktree BT827, for receiving composite video via a standard RCA (Radio Corporation of America) jack 146. Graphics data is transmitted to the monitor 102 through a conventional video graphics array (VGA) connector 142. Additionally, the graphics controller 120 supports a Video Electronic Standards Association (VESA) connector 144 for multimedia applications. In one embodiment of the computer system C a 3D graphics controller, such as a VirgeGX multimedia accelerator made by S3 Corporation, is utilized and in another embodiment a 2 dimensional graphics controller, such as a Trio64V2 multimedia accelerator made by S3 Corporation, is utilized.

The ISA bus 136 is further coupled to one or more ISA slots 148, an input/output (I/O) controller 150 and an audio controller 152. The I/O controller 150 incorporates a keyboard controller which is connectable to a keyboard 154 and a mouse 156 through PS/2 style connectors 158 and 160 respectively; a floppy disk controller which is connected to a floppy disk drive 162; two 16C550 compatible universal asynchronous receiver/transmitter (UARTs) which are connected to a pair of serial port connectors 164; and one multi-mode parallel port which is connected to a parallel port connector 166. One example of the I/O controller is an FDC37C685 made by Standard Microsystems Corporation. It is also contemplated that the keyboard 154 could be connected to the base system B via the USB 126 instead of connecting directly to the keyboard interface 158. In another variant, a USB keyboard 154 could include a USB hub to connecting with a USB mouse.

The audio controller 152 is a single mixed-signal controller that provides 16-bit stereo sound and frequency modulation a (FM) music synthesis. It includes an embedded microprocessor, a 20-voice FM music synthesizer, a 16-bit stereo wave coder/decoder (CODEC), a 16-bit stereo music digital-to-analog (DAC), a hardware master volume control, serial port, dual game port, and supports an external wavetable music synthesizer. The audio controller 152 has six I/O lines: a joystick interface 168 for connecting to a joystick 170; a microphone interface 172 for connecting to a microphone 174; an audio input line 176; an audio output line 178; a CD-ROM line (not shown) for receiving audio from the CD-ROM 134; and a speaker line 180 for connecting with the monitor speakers 104, or alternatively, a set of stand-alone speakers 182. The audio controller 152 further couples to a tone generator 184. One example of the audio controller 152 is an ES 1887 AudioDrive made by ESS Technology, Inc.

The universal serial bus 126 is a peripheral bus standard developed by PC and telecom industry leaders that allows plug and play of computer peripherals outside the base system B, eliminating the need to install cards into the PCI slots 116 or ISA slots 148 and reconfigure the computer system C. The USB 126 allows computer peripherals to be automatically configured as soon as they are physically attached—without the need to reboot or run setup. The USB 126 also allow multiple devices, up to 127, to run simultaneously on the computer system C.

The USB 126 uses a "tiered star topology" which means that some USB devices—called USB "hubs"—can serve as connection ports for other USB peripherals—also called "functions". With peripherals such as the monitor 102 and keyboard 154 acting as additional plug-in sites, or hubs, only one USB device needs to be plugged into the computer system C. Other devices can then be plugged into the hub. In the preferred embodiment, the monitor 102 includes a USB hub having one upstream port for plugging directly into the base system B and four downstream ports for additional functions explained below. For further details on the Universal Serial Bus, please refer to the Universal Serial Bus Specification available on the World Wide Web at "http://www.usb.org," or from Intel Corporation, which is hereby incorporated by reference.

Figure 2:
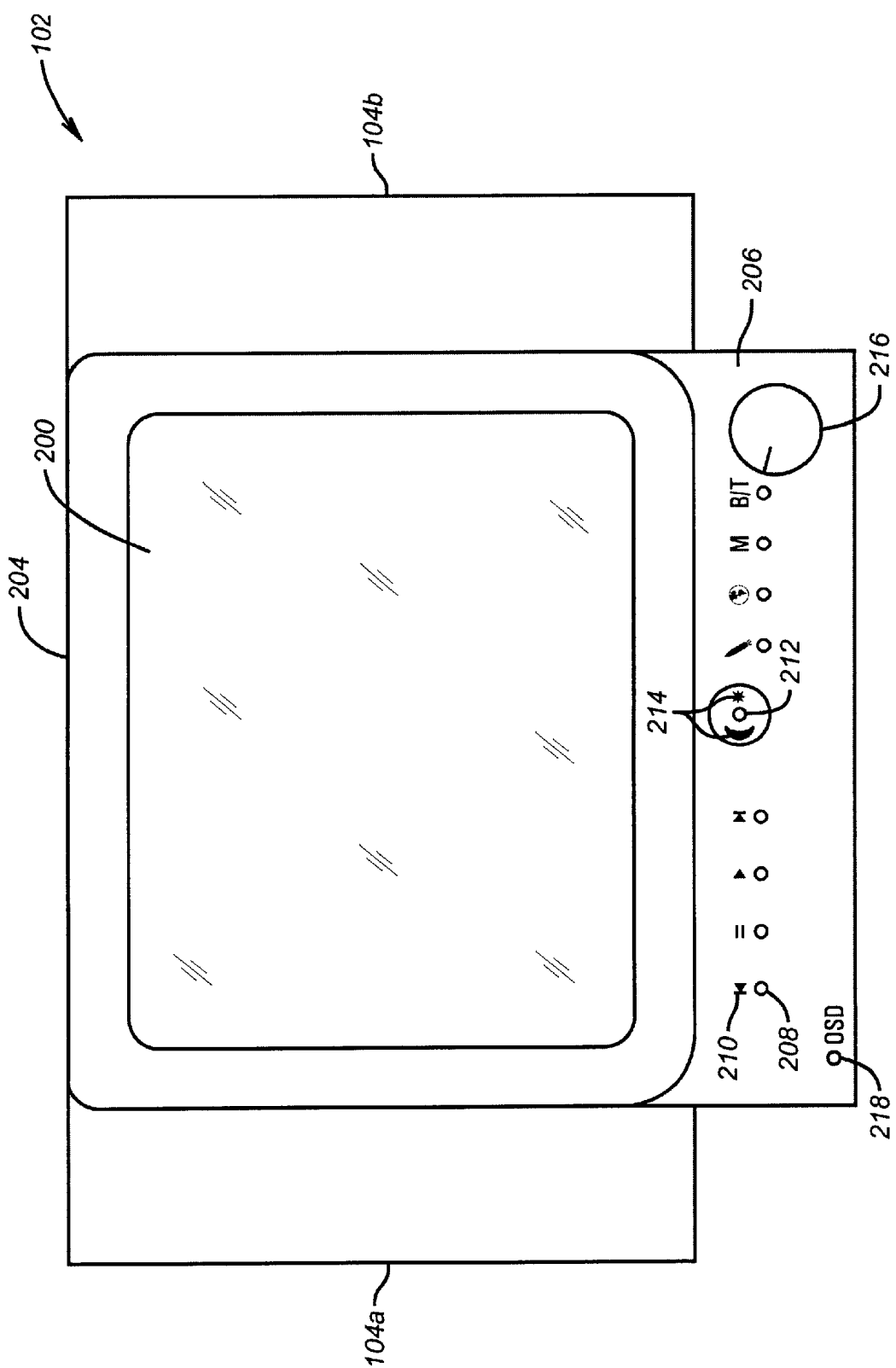
FIG. 2 is a front view of a monitor M according to the preferred embodiment.

Referring now to FIG. 2, there is illustrated a front view of the monitor 102 in greater detail. Other views are not necessary for a complete understanding of the invention. The monitor 102 comprises a CRT 200 and its related circuitry encased in an rigid enclosure 204, made of plastic or the like, which forms a bezel 206 around a face of the CRT 200. Integral with the enclosure on opposing sides of the CRT 200 are speakers 104a and 104b. The speakers 104a–b receive an audio signal from the base system B via the analog speaker line 180. It is contemplated that the speakers could alternatively receive audio data via the USB 126.

On a front lower portion of the bezel 206 are a number of buttons 208 with corresponding LEDs 210. On a left hand side are four buttons for controlling playback of the CD-ROM 134, including: a play button, a next track button, a previous track button, and a stop button. Each button has a backlit icon associated therewith for ease of identification. By default, the icons are lit. While the button is depressed, the icon 210 is not lit. On a right side are four additional buttons for other control functions. One button is user programmable to launch (load or execute) a favorite software application; another button is preprogrammed to launch an internet browser; a third button is preprogrammed to mute the speakers; and a fourth button is predefined to alternate between volume, bass and treble audio control. Another button 218 is used to provide an indication to the processor 100 that an on-screen display (OSD) should be displayed for configuring the monitor attributes, such as horizontal and vertical position; horizontal and vertical size; and pin cushion and trapezoidal compensations. It is contemplated that contrast and a brightness adjustments could be made with the on-screen display also, however, the preferred embodiment uses conventional analog dials for these controls. The buttons 208 are coupled to a USB hub inside the monitor 102 for communicating their status with the processor 100.

In addition to the buttons and LEDs, there is a audio control 216 on the front bezel for controlling the volume/bass/treble of the audio produced by the audio controller 152. The audio control 216 utilizes a shaft encoder. A single one of the buttons 208 is operable to cause an onscreen display toggle between volume, bass and treble control. Not shown are conventional analog control dials for controlling monitor contrast and brightness. It is understood that other controls and LEDs could be utilized without changing the spirit of the invention. The function of the buttons is described in Table I.

TABLE I

| BUTTON | DESCRIPTION |
|---|---|
| CD Play/Pause button 208 | When this button is pressed a command is sent to base system B over the USB 126 to start the play function. Once the play function has been invoked, the function of the button toggles to pause. |
| CD Stop button 208 | When this button is pressed a command is sent to base system B over the USB 126 to start the stop function. |
| CD Next Track button 208 | When this button is pressed a command is sent to base system B over the USB 126 to start the next track function. |
| CD Previous Track button 208 | When this button is pressed a command is sent to base system B over the USB 126 to start the previous track function. |
| User configurable button 208 | When this button is pressed a command is sent to base system B over the USB 126 to start the user configured function. |
| Internet button 208 | When this button is pressed a command is sent to base system B over the USB 126 to start the Internet function. |
| Mute button 208 | When this button is pressed a command is sent to base system B over the USB 126 to mute the sound. Once the mute function has been invoked, the function of the button toggles to enable the sound. |
| Audio button 208 | Pushing this button sequentially effectively changes the function of the volume shaft encoder. The default function of the shaft encoder is volume control. There is a fixed time-out period of seven (7) seconds. The time-out is counted after the button is pressed. The time-out count is restarted every time the audio button is pressed or the shaft encoder is turned. After the time-out period, the function of the shaft encoder automatically reverts to volume control. Pushing the button once changes the function of the shaft encoder to Bass control, pushing the button a second time (before time-out) changes the function of the shaft encoder to treble control. Pushing the button a third time (before time-out) changes the function of the shaft encoder back to volume control. Turning the shaft encoder causes the module to send signals to the base system B over the USB 126 to adjust the audio control corresponding to the current function of the shaft encoder. In all cases, turning the shaft encoder clockwise causes an increase in the control and turning the shaft encoder counter-clockwise causes a decrease in the control. The function of the shaft encoder is made clear to the user by visual feedback via the on screen display (OSD). Normally there is no OSD and the (default) function of the shaft encoder is volume control. Turning the shaft encoder under this basic condition causes the OSD to display a volume control pictogram. Pressing the Audio button one time causes the OSD to display a bass control pictogram. This condition lasts for the time-out period. After the time-out period elapses the OSD clears. Pressing the Audio button a second time before a time-out occurs causes the OSD to display a treble control pictogram. This condition lasts for the time-out period. After the time-out period elapses the OSD clears. Pressing the Audio button a third time before a time-out occurs, causes the OSD to clear. At this (default) point, if the shaft encoder is adjusted the OSD will display a volume control pictogram. |

TABLE I-continued

| BUTTON | DESCRIPTION |
|---|---|
| Sleep button 212 | When this button is pressed a command is sent to base system B over the USB 126 to place the computer system C into sleep. Preferably, this button is pressed again to wake-up the computer C. Preferably, no other device can wake up the system. |
| OSD button 218 | When this button is pressed, a command is sent to the base system B over the USB 126 indicating that the button 218 was depressed. Thereafter, a mouse controlled applet (MONITOR.CPL) is launched for monitor control. Based upon mouse selected functions, corresponding commands are sent to the monitor 102 from the base system B over the USB 126. These commands cause the monitor's microcontroller to execute the desired monitor control commands. The applet remembers the previous state of monitor controls upon power on. |

In addition to the above described buttons and LEDs, there is another centrally located button 212 for placing the computer system C into a sleep mode to conserve energy. There are two LEDs associated with the sleep button 212 for indicating the state of the computer system C. One of the icons is a "SUN" and another is a "MOON." Table II is a state table for the illumination of the LEDs.

TABLE II

|  | SUN | MOON | LEDs 210 |
|---|---|---|---|
| Normal Operation | ON | OFF | ON |
| Display Power Management System (DPMS) Standby | ON | OFF | ON |
| DPMS Suspend | OFF | ON | ON |
| Sleep | OFF | ON | OFF |
| Base System B power off | OFF | OFF | OFF |

The DPMS standby and suspend modes are controlled by the graphics controller 120. The standby mode is entered when the graphics controller 120 ceases providing a horizontal synch signal to the monitor 102. The suspend mode is entered when the graphics controller 120 ceases providing a vertical synch signal to the monitor 102. Both of these events cause the monitor 102 to enter a low power mode and blank the screen. The system can awake from suspend or standby modes in response to any user input. Sleep mode is entered by one of at least two methods: 1) when the processor 100 detects a certain period of inactivity, and 2) when the sleep button 212 is depressed. In sleep mode, the screen is blanked and the processor 100 is stopped to conserve power. The computer system C can awake from sleep mode. All LEDs 210, including the "SUN" and "MOON" icons, are off when the base system B is powered off. Thus, the "SUN," "MOON" and LED 210 icons are responsive to commands received from the processor 100 via the USB 126.

Figure 3:
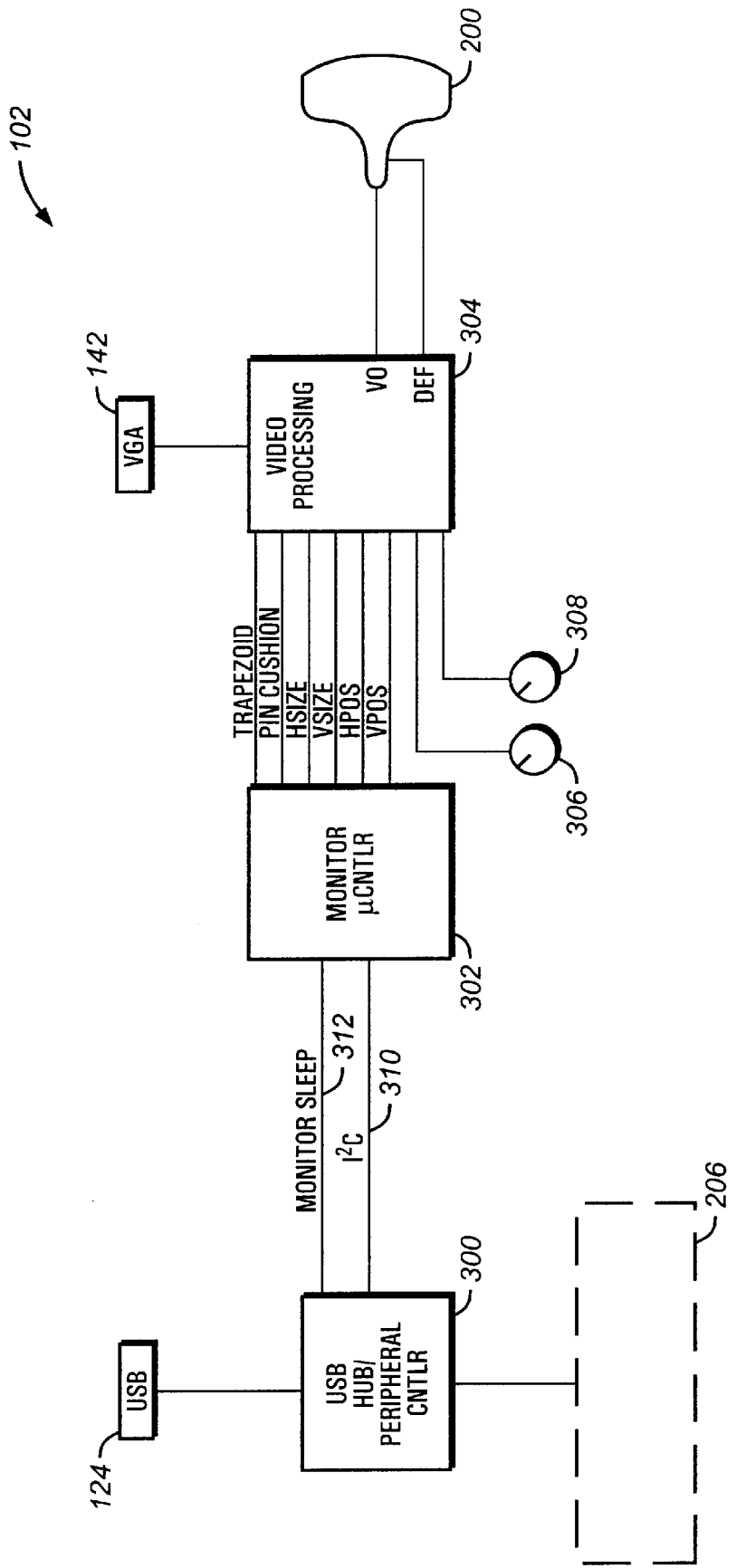
FIG. 3 is a schematic diagram of certain circuitry of the monitor 102 according to the preferred embodiment.

Referring now to FIG. 3, there is illustrated a schematic diagram of certain circuitry of the monitor 102 according to the preferred embodiment. A USB hub/peripheral controller 300, such as an Intel 83930HX Universal Serial Bus Microcontroller, is connected to a monitor microcontroller 302, such as an Motorola MC68HCP058. The USB hub/peripheral controller 300 includes a USB hub and USB embedded function capabilities, as well as a MCS 251 microcontroller. For more information on the USB hub/peripheral controller 300, please refer to specification No. 272928-003, entitled "8×930Hx Universal Serial Bus Hub Peripheral Controller," and specification No. 274929-001, entitled "8×930Ax, 8×930Hx Universal Serial Bus Microcontroller User's Manual" published by Intel Corporation and available on the World Wide Web at "http://developer.intel.com/design/usb," both of which are hereby incorporated by reference.

The monitor microcontroller 302 is operable to control various monitor attributes, such as horizontal and vertical position; horizontal and vertical size; and pin cushion and trapezoidal compensations. The monitor microcontroller 302 is connected to a conventional video processing system 304 of the monitor 102. The video processing system 304 receives standard analog RGB (red, green blue) input from the VGA connector 142 when coupled to the base system B. In the preferred embodiment, contrast and brightness controls are provided to the video processing system 304 from two standard voltage potentiometers 306 and 308. Alternatively, the contrast and brightness control information could be provided from the monitor microcontroller 302. After processing the RGB input according to the monitor attributes, the video processing system 304 provides a video output (VO) signal to the CRT 200 which is controlled by a set of deflection control signals (DEF).

The USB hub/peripheral controller 300 is operable to provide a communications link between the base system B and the monitor 102 over the USB 126. More particularly, the USB hub/peripheral controller 300 is operable to receive bezel button signals for passing to the base system B and operable to receive processor 100 sleep information from the base system B for controlling the state LEDs 214. Additionally, the USB hub/peripheral controller 300 receives the monitor attribute information from the base system B via the USB 126 for passing to the monitor microcontroller 302. Because the bezel buttons 208 and LEDs 210 are under control of the hub/peripheral controller 300, even though the processor 100 is inoperable or asleep the bezel buttons 208 and LEDs 210 are operable. Hence, an LED 210 could be blinked by the hub/peripheral controller 300 while the processor 100 is asleep. This is useful, for example, where a sustained blinking LED indication is needed, such as for indicating that a fax or message has been received.

An $I^2C$ (Inter Integrated Circuit, pronounced "eye squared see") bus 310 connects the monitor controller 302 to the USB hub/peripheral controller 300. The $I_2C$ bus 310 is a two-wire synchronous, serial interface which allows communication between intelligent IC devices. For more general information on the $I^2C$ bus 310, please refer to the $I^2C$ Bus Specification available from Philips Semiconductors and hereby incorporated by reference. For additional information on the implementation of the $I^2C$ bus 310 on the USB hub/peripheral controller 300, please refer to Application Note AP476 entitled "How to Implement $I^2C$ Serial Communication Using Intel MCS® 51 Microcontrollers" available from Intel Corporation and hereby incorporated by reference.

The monitor microcontroller 302 also provides a MONITOR SLEEP signal 312 to the USB hub/peripheral controller 300 when the monitor microcontroller 302 places the monitor 102 into a low power mode (DPMS suspend mode). The USB hub/peripheral controller 300 is responsive to the MONITOR SLEEP signal 312 to control the "SUN" and "MOON" LEDs 214 in accordance with Table II Referring now to FIG. 4, there is illustrated a detailed block diagram of the USB hub/peripheral controller 300 and the bezel circuitry 206. The USB hub/peripheral controller 300 includes an MCS® 51 compatible microcontroller architecture including four 8-bit I/O ports—two of which are utilized by the present invention. A port1 314 is connected to two 8-bit selector/multiplexors 316 and 318. Each selector 316 and 318 receives three select signals from port1 314. Each selector 316 and 318 provides a data output to port1 314.

Selector 316 receives input from the eight bezel buttons 208. The bezel buttons 208 are comprised of a normally open switch. One end of the switch 208 is connected to a resistor R1, an anode end of a light emitting diode (LED) 210 and a data input of the selector 316. An opposite end of the switch 208 is connected to a cathode end of the LED 210 and a current limiting resister R2. The switch 208, resistor R1 and LED 210 form a single bezel button user interface 320. Although it is not shown, each data input of the selector 316 has associated with it a bezel button user interface 320. The eight bezel button user interfaces include: four buttons for controlling playback of the CD-ROM 134, a fifth button that is user programmable to launch (load or execute) a favorite software application; a sixth button that is preprogrammed to launch an internet browser, a seventh button that is preprogrammed to mute the speakers; and an eighth button that is predefined to alternate between bass and treble audio control.

Selector 318 receives input from two switches: the OSD switch 218, and the SLEEP switch 212. One end of the OSD switch 218 is connected to a resistor R3 and a data input of the selector 318. An opposite end of the OSD switch 218 is connected to ground. One end of the SLEEP switch 212 is connected to a resistor R4 and a data input of the selector 318. An opposite end of the SLEEP switch 212 is connected to ground.

The USB hub/peripheral controller 300 is operable to write data to port1 314 to cause a selection to be made at the selectors 316 and 318. While the selection is made, each selector 316 and 318 provides data at a Y output to the port1 314 from one of its eight data inputs. After the data is read, a different selection is made. This is repeated so that all ten switches 208, 218 and 212 are continuously monitored. Port1 314 also reads the state of the MONITOR SLEEP signal 312.

A port3 320 provides a clock and data line for the $I^2C$ bus 310 interface. Port3 320 also controls the "SUN" and "MOON" LEDs 214 via a driver 324. One output of the port3 320 supplies a COMMON signal 322 to turn on and off the IFDs 210. Normally, the LEDs 210 are illuminated, except when a bezel button 208 is depressed, and the COMMON signal 322 is forced low. However, if the COMMON signal 322 is forced high, the LEDs 210 are turned off.

The port3 320 also receives up/down pulses from a audio control shaft encoder 216. Recall that the audio control is operable to control volume, bass and treble based on the audio button 208. Rotating the audio control 216 to the right (clockwise) causes a command to be sent to the processor 100 over the USB 126 to increase the current audio function, rotating the volume control 216 to the left (counterclockwise) causes a command to be sent to the processor 100 over the USB 126 to decrease the current audio function.

Figure 5:
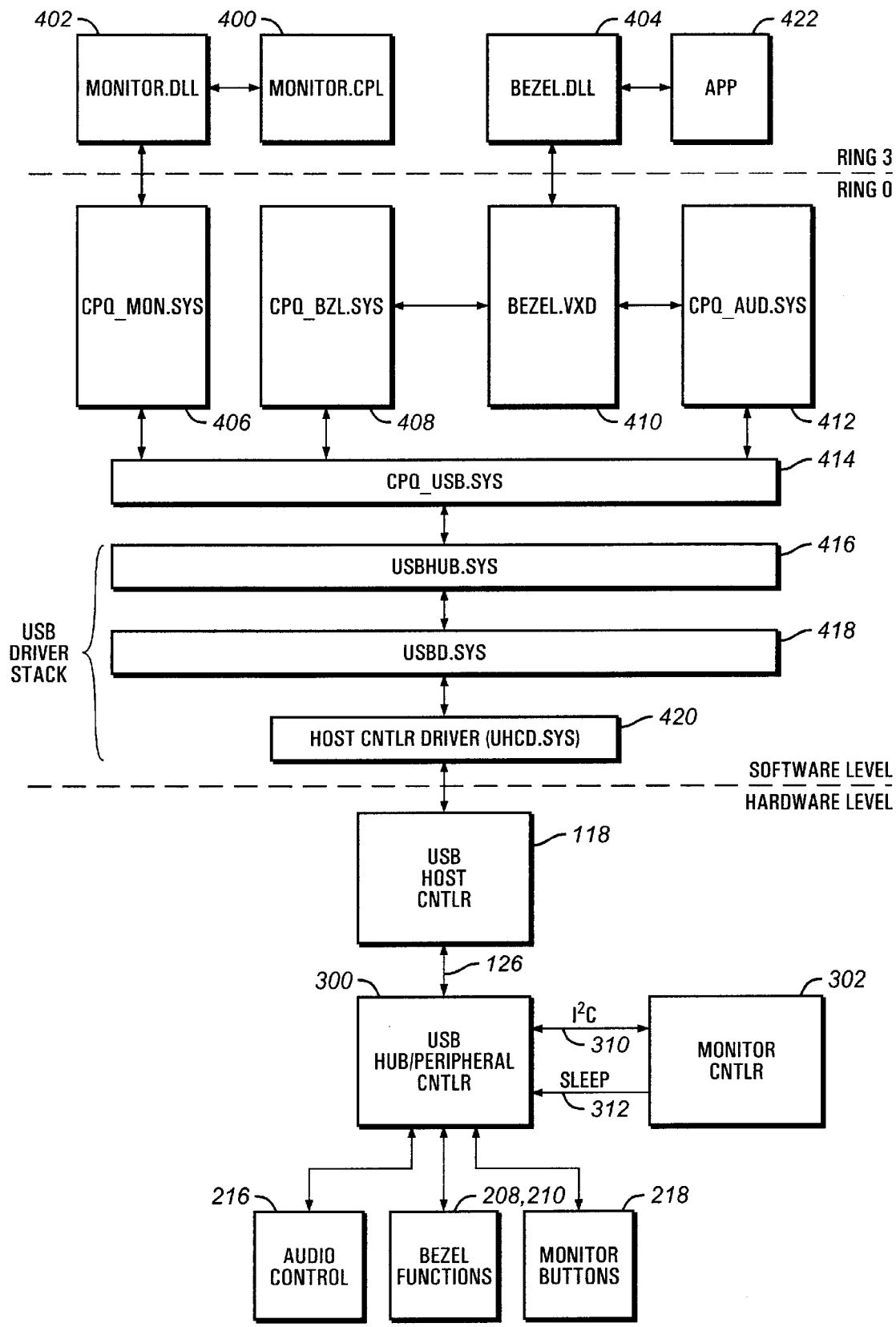
FIG. 5 is a block diagram of a number of hardware and software layers of the present invention according to the preferred embodiment.

Now referring to FIG. 5, there is illustrated a block diagram of a number of hardware and software layers of the present invention according to the preferred embodiment. The present embodiment of the invention utilizes a Windows95 operating system running on x86 compatible processor. However, since much of the device driver software is written according to a Microsoft WIN32 Driver Model (WDM), those drivers are the also compatible with a Windows NT operating system (and the Microsoft Windows "Memphis" OS). Of course, the principles disclosed herein could be utilized to develop drivers for other operating systems, such as OS/2 and UNIX; and processors, such as a Digital Equipment Corporation (DEC) Alpha, a Silicon Graphic MIPS processor, or a International Business Machines (IBM) PowerPC.

Figure 4:
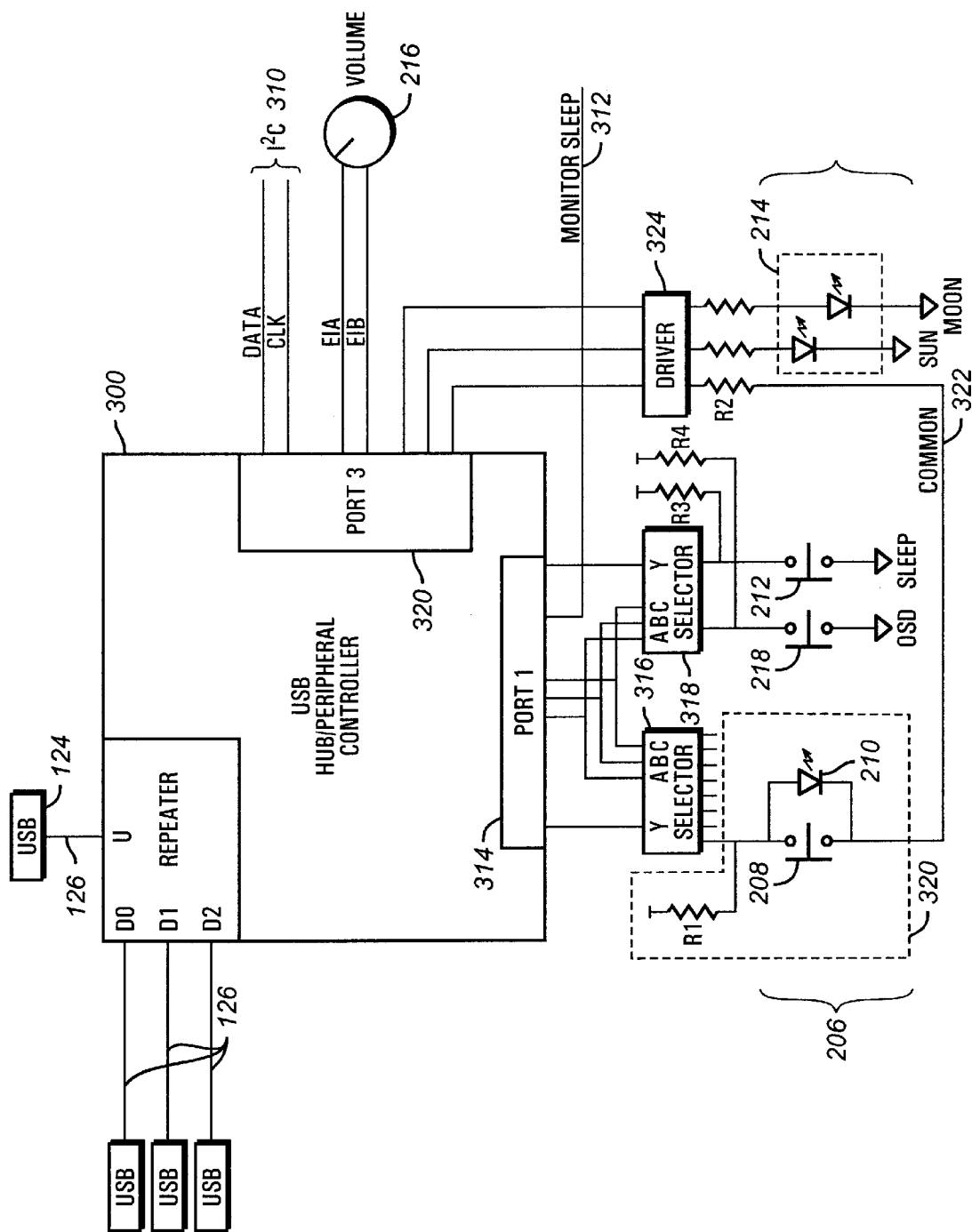
FIG. 4 is a more detailed block diagram of the USB hub/peripheral controller and the bezel circuitry of FIG. 3.

The PCI/ISA Bridge 118 (USB Host controller) is shown coupled to the USB hub/peripheral controller 300 via the Universal Serial Bus 126 as illustrated in FIGS. 3 and 4. The remaining hardware connected to the USB hub/peripheral controller 300 has been described above and therefore its description is not repeated here. It is shown for a better understanding of the data flow.

There is software operating at a ring 3 layer and a ring 0 layer. Ring 3 is generally used for user applications while ring 0 is generally used by system software since there is much more protection for ring 0 software. At ring 3 is a MONITOR.CPL applet 400, a MONITOR.DLL dynamic link library 402, and a BEZEL.DLL dynamic link library 404.

Figure 6:
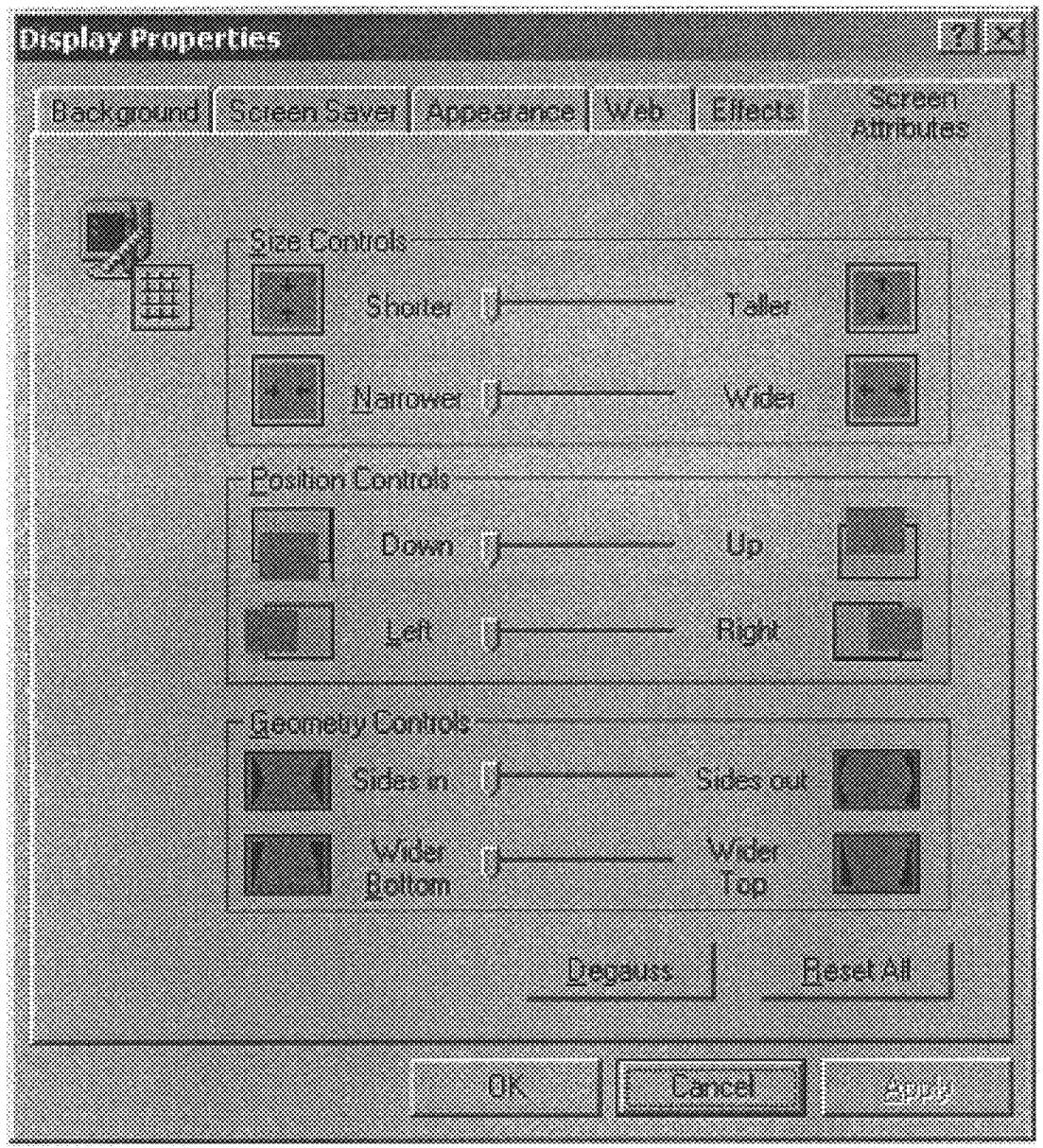
FIG. 6 is a screen shot of an on-screen display applet of the invention.

The MONITOR.CPL module 400 is a Windows95 control panel applet used to set screen attributes. A screen snapshot of the user interface presented by the MONITOR.CPL is illustrated in FIG. 6. When the OSD button 218 is pressed, a command is sent to the processor 100 over the USB 126 indicating that the button 218 was depressed causing the MONITOR.DLL 402 to load MONITOR.CPL 400. The MONITOR.DLL 402 is a dynamic link library that implements the monitor interface to applications. Applications, such as MONITOR.CPL, can use the MONITOR.DLL 402 to read and write attributes to the monitor device. In turn, the MONITOR.DLL 402 reads and writes the monitor 102 screen attributes via a USB monitor device driver (CPQ_MON.SYS) 406.

The CPQ_MON.SYS 406 is a ring 0 USB device driver having a ring 3 interface. The MONITOR.DLL 402 uses a Windows DeviceIoControl function to communicate with the CPQ_MON.SYS driver 406 at ring 0. There are a number of other ring 0 modules, including: a bezel board driver (CPQ_BZL.SYS) 408, a legacy bezel board driver (BEZEL.VXD) 410, and an audio driver (CPQ_AUD.SYS) 412. These ring 0 modules further communicate with a single USB device driver (CPQ_USB.SYS) 414. Because all the functions available through the monitor bezel 206 are treated by the USB 126 as a single USB device, a single device driver (CPQ_USB.SYS) is utilized. When the USB 126 identifies the monitor 102 connected, the CPQ_USB.SYS 414 is loaded. In turn, CPQ_USB.SYS 414 will load CPQ_MON.SYS 406, CPQ_BZL.SYS 408, and CPQ_AUJD.SYS 412, the monitor, bezel board, and audio drivers respectively. This architecture allows these three drivers to sit parallel to each other rather than stacked on top of each other if each was treated as a separate USB function.

The CPQ_USB.SYS driver 414 simply operates to pass USB commands from the higher level drivers to a USB hub driver (USBHUB.SYS) 416. The higher level drivers (CPQ_MON.SYS 406, CPQ_BZL.SYS 408, and CPQ_AUD.SYS 412) use Windows ReadFile and WriteFile functions to communicate with the USBHUB.SYS 416 (LSB driver stack). The USBHUB.SYS driver 416 is a standard hub controller driver (preferably provided by Microsoft) loaded when a USB class driver (USBD.SYS) 418 enumerates the root hub built into the host controller 118. The USBHUB.SYS driver 416 communicates with the USBD.SYS 418 (preferably provided by Microsoft) to form the main USB driver interface. The USBD.SYS 418 is a USB class driver for supporting the USB 126 in the Windows95 OS which is provided by Microsoft Corporation as part of OSR 2.1.

In turn, the USBD.SYS 418 communicates with a Universal Host Controller Driver (UHCD.SYS). Together, the USBHUJB.SYS 416, USBD.SYS 418 and UHCD.SYS 420 drivers form what is known as a USB driver stackl As an alternative to the UHCD.SYS driver 420 which is written in accordance with a Universal Host Controller Interface Specification (UHCI), the host controller 118 could operate with an OpenHCI driver. For more details on the Open Host Controller Interface Specification for USB driver, please refer to the OpenHCI Specification published by Compaq Computer Corporation, which is hereby incorporated by reference. For more details on the Universal Host Controller Interface Specification, please refer to the Universal HCI Design Guide published by Intel Corporation and available on the World Wide Web at "http://developer.intel.com/design/usb," which is hereby incorporated by reference.

The UHCD.SYS 420 (preferably provided by Microsoft) provides a software layer between the host controller 118 and the USBD.SYS 418. The UHCD.SYS 420 interprets requests from the USBD.SYS 418 and builds frame list, transfer descriptor, queue, head, and data buffer data structures for the host controller 118. The data structures are built in memory 112 and contain all necessary information to provide end-to-end communication between CPQ_MON.SYS, CPQ_BZL.SYS, and CPQ_AUDj.SYS and the hub/peripheral controller 300.

Note that the CPQ_BZL.SYS 408 and CPQ_AUD.SYS 412 communicate with a bezel virtual device driver (BEZEL.VXD) 410 which communicates the bezel board dynamic link library (BEZEL.DLL) 404. Instead of using a WIN32 Driver Model (WDM), the BEZEL.VXD 410 was utilized because it was stable code with a well defined ring 3 interface to trap and communicate bezel button information using non-maskable interrupts (NMI) callbacks from the basic input/output service (BIOS). A WDM module is contemplated, however.

The BEZEL.DLL 404 supports a number of multimedia applications 422, such as a CD-ROM player, MIDI player and other applications requiring the bezel buttons 208. When one of the applications is loaded, the application 422 loads the BEZEL.DLL 404 and dynamically grabs function pointers to obtain Windows handles and register the bezel buttons with the application 422. This way, when bezel button events are passed to BEZEL.DLL 404 from USB 126, BEZEL.DLL 404 can look up the application 422 registered to the bezel button 208 and distribute the event to the appropriate application 422. In turn, the BEZEL.DLL 404 loads the BEZEL.VXD and registers with the BEZEL.VXD to obtain a Windows handle. The BEZEL.DLL 404 communicates with the BEZEL.VXD 410 with Windows DeviceIoControl functions. The BEZEL.VXD 410 communicates to the BEZEL.DLL 404 by posting Windows messages.

When BEZEL.VXD 410 is loaded, it looks for CPQ_BZL.SYS 408 and CPQ_AUD.SYS 412. It performs a WriteFile to each WDM driver 408 and 412 to register with it and obtain a function pointer. In turn, CPQ_BZL.SYS 408 and CPQ_AUD.SYS maintain the pointer for reciprocal communication.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of implementing bezel buttons to control a peripheral in a computer system incorporating a monitor, a processor, and a multimedia application, the monitor incorporating a monitor controller, bezel push buttons, and a display, the method comprising:

determining a multimedia application is present in the computer system;

responsive to determining the multimedia application is present, dynamically assigning functionality of the multimedia application to the bezel push buttons;

receiving an activation from the bezel push buttons selectively repeating the steps of determining and dynamically assigning responsive to a user input; and responsive to receiving the activation, executing multimedia application code in the multimedia application associated with the functionality assigned to the bezel push buttons.

2. The method of claim 1, wherein the step of dynamically assigning functionality to the bezel push buttons includes obtaining window handles and registering the function to the bezel push buttons.

3. The method of claim 1, wherein the step of determining a multimedia application is present includes determining if a MIDI player is present.

4. The method of claim 1, wherein the step of determining multimedia application present includes determining if a CD-ROM player is present.

5. A system connectable to a monitor with bezel push buttons, the system for communicating with a multimedia application upon a bezel push button event, the system comprising:

a microcontroller;

multimedia application code, the multimedia application code, when executed, causing the microcontroller to perform the steps of:

determining a multimedia application is present in the computer system;

responsive to determining the multimedia application is present, dynamically assigning functionality of the multimedia application to the bezel push buttons;

receiving the activation from the bezel push buttons selectively repeating the steps of determining and dynamically assigning responsive to a user input; and responsive to receiving the activation, executing multimedia application code in the multimedia application associated with the functionality assigned to the bezel push buttons.

6. The system of claim 5, wherein the step of dynamically assigning functionality to the bezel push buttons includes obtaining window handles and registering the function to the bezel push buttons.

7. The system of claim 5, wherein the step of determining a multimedia application is present includes determining if a MIDI player is present.

8. The system of claim 5, wherein the step of determining multimedia application present includes determining if a CD-ROM player is present.

9. A computer system for communicating with a multimedia application upon a bezel push button event, the computer system comprising:

a microcontroller;

a monitor coupled to the microcontroller, the monitor including bezel push buttons;

a multimedia application coupled to the microcontroller;

multimedia application code, the multimedia application code, when executed, causing the microcontroller to perform the steps of:

determining the multimedia application is present in the computer system;

responsive to determining the multimedia application is present, dynamically assigning functionality of the multimedia application to the bezel push buttons;

receiving the activation from the bezel push buttons selectively repeating the steps of determining and dynamically assigning responsive to a user input; and responsive to receiving the activation, executing the multimedia application code in the multimedia application associated with the functionality assigned to the bezel push buttons.

10. The computer system of claim 9, wherein the step of dynamically assigning functionality to the bezel push buttons includes obtaining window handles and registering the function to the bezel push buttons.

11. The system of claim 9, wherein the step of determining the multimedia application is present includes determining if a MIDI player is present.

12. The system of claim 9, wherein the step of determining multimedia application present includes determining if a CD-ROM player is present.

* * * * *